_United States Patent Office_

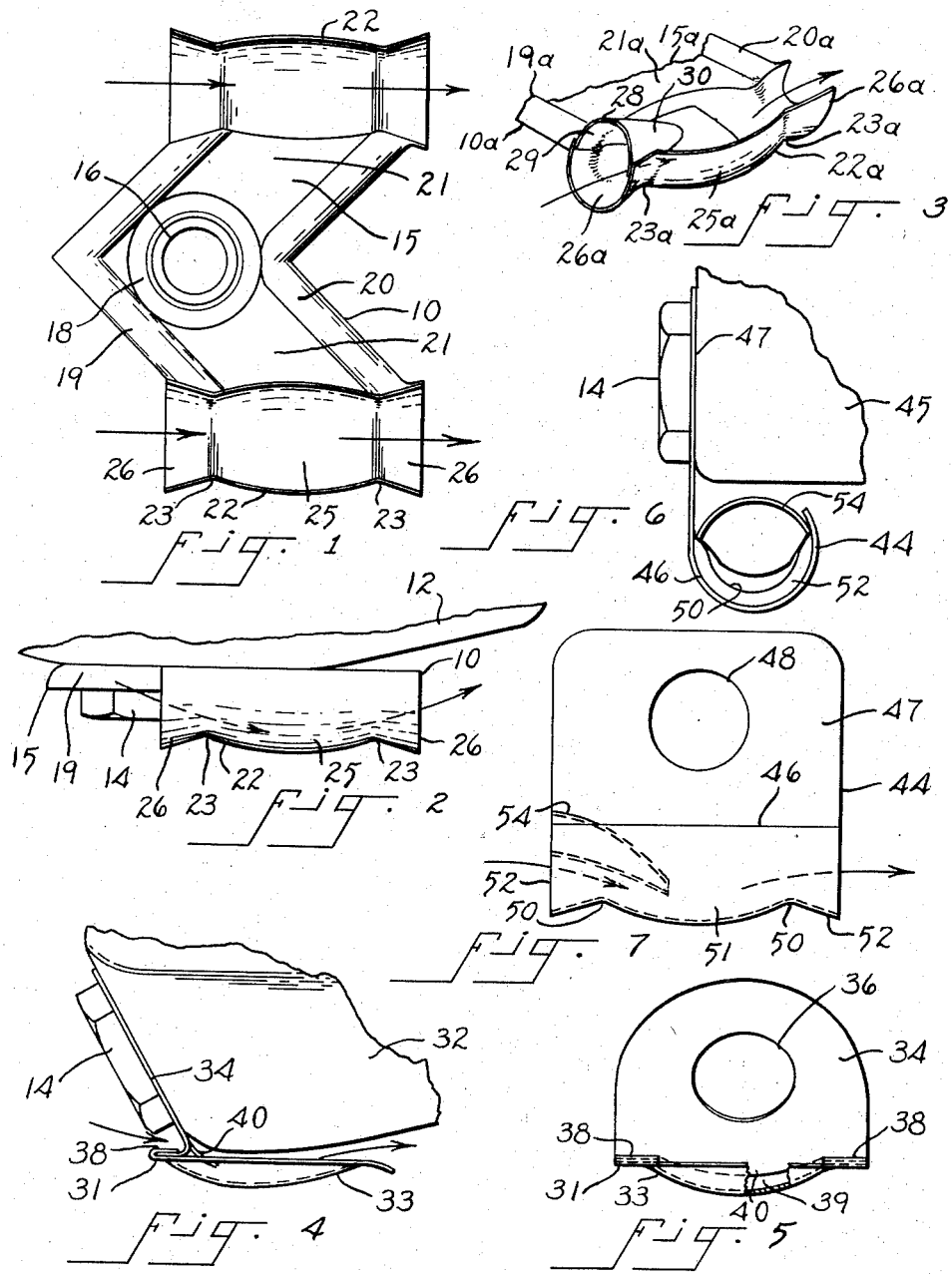

2,868,329
Patented Jan. 13, 1959

2,868,329
OIL DRIP COLLECTOR FOR VEHICLE
Edward I. Phelps, Portland, Oreg.
Application July 17, 1956, Serial No. 598,405
2 Claims. (Cl. 184—106)

This invention relates to an oil drip collector or catch device, and more specifically relates to a drip collector applicable to a vehicle for receiving oil which may escape therefrom.

A principal object of the present invention is to provide a novel oil drip collector adapted for use with a vehicle lubricant housing for catching and temporarily holding oil which may escape from the housing.

Another object is to provide a vehicle drip collector which is self-emptying when the vehicle is in normal use, without requiring the attention of the operator.

Another object is to provide an oil drip collector for a vehicle which catches and holds escaped oil while the vehicle is standing still and which is emptied by air currents when the vehicle is traveling on the road.

Further objects are to provide a drip collector for a vehicle crankcase or transmission which is simple in construction and inexpensive to manufacture; which is conveniently applied to the crankcase or transmission structure, and which is applicable to popular makes of vehicles.

The objects enumerated above are accomplished by certain preferred embodiments of drip collector adapted to be disposed under the lowest point of a vehicle crankcase for catching oil which may escape from gasketed joints of the crankcase or from other sources, such as a shaft seal or drain plug. Any oil which may escape from the crankcase above the drain plug will flow along the outer surface of the crankcase and establish a dripping point, generally at the drain plug. To catch all the drippings and thereby prevent said drippings from falling on a garage floor or a driveway and staining these areas, the present drip collector is disposed in a position adjacent the drain plug and preferably is held on the crankcase by said plug. The drip collector has means for catching the oil drippings and has sump portions into which the oil is temporarily accumulated.

An important feature of the present invention is that the sump portions have air inlet and outlet means through which air currents flow when the vehicle is traveling on the road for forcefully ejecting the oil from the sump. Thereby the oil will be collected in the sump when the vehicle is standing still but will be ejected therefrom when the vehicle attains a certain speed on the road. In this way, the garage floor or driveway where the vehicle customarily stands is kept clean and any leakage from the crankcase is deposited where it will be less objectionable and conspicuous. This is of particular advantage where the vehicle parking place is also used as a play area for children or as a patio in connection with a dwelling.

The invention will be better understood and additional objects and advantages will become apparent from the following description taken in connection with the accompanying drawings which illustrate preferred forms of the invention. It is to be understood, however, that the invention may take still other forms, and that all such modifications and variations within the scope of the appended claims, which will occur to persons skilled in the art, are included in the invention.

In the drawings:

Figure 1 is a top plan view of one form of the drip collector of the present invention adapted to be mounted on a crankcase having the drain plug in its bottom wall;

Figure 2 is a side elevational view of the drip collector of Figure 1 as applied to the crankcase;

Figure 3 is a fragmentary perspective view of a modified form of the Figure 1 structure utilizing baffle means for deflecting air currents downwardly into the sump portions;

Figure 4 is a side elevational view of a modified form of drip collector applicable to a crankcase having its drain plug located on an angular front wall thereof;

Figure 5 is a front elevational view of the drip collector of Figure 4;

Figure 6 is a front elevational view of still another form of drip collector applicable to a crankcase having its drain plug located on a vertical side wall thereof; and Figure 7 is a side elevational view of the drip collector of Figure 6.

Referring first to Figures 1 and 2, there is illustrated a drip collector 10 adapted to be applied to a crankcase 12 of the type having a drain plug 14 threadedly mounted in the bottom wall thereof. The drain plug 14 is located at the lowest point in the crankcase which is generally a sump portion, and, without the use of the present invention, any oil which may escape through the drain plug opening will drip off the head of the drain plug. Also, any oil which may be present on upper outside portions of the crankcase will run to the drain plug, and, similarly, will drop from the head thereof.

The collector 10 is intended to intercept the oil which has escaped either from the drain plug or other portions of the crankcase, or engine, and prevent it from dripping on a garage floor or driveway. A body portion 15 has a central aperture 16 for receiving the drain plug 14. A washer 18 is provided on the top side of the body portion 15 at the aperture 16 and is preferably formed of a soft metal so that the drain plug, when tightened, will form an oil-tight seal at the opening in the crankcase for said plug.

Disposed at the front and rear edges of the body portion 15 are ridges 19 and 20, respectively, which form therebetween lateral, channel-shaped runways 21. Disposed at the sides of the body portion 15 are semi-circular troughs 22 open at the top and having their top edge portions in substantially the same plane as the top of ridges 19 and 20. Each of the troughs 22 has restricted throat portions 23 spaced inwardly from the ends thereof. Intermediate the throat portions 23 is a sump or chamber 25, and leading outwardly from the throat to the ends of the receptacles are flared mouth portions 26. The oil collector is mounted on a vehicle in a position so that the members 22 are disposed lengthwise of the vehicle whereby, when the vehicle is traveling on the road, strong air currents flow through the troughs 22.

As best seen in Figure 2, the device is held firmly against the bottom of the crankcase 12 by means of the drain plug 14, and, as the top edges of the troughs 22 are in substantially the same plane as the top edges of the ridges 19 and 20, a portion of the top of these troughs will be closed by the bottom of the crankcase. With the present device in place, any oil which may seep through the drain plug or flow down the outside of the crankcase, will be directed into the runways 21 between the ridges 19 and 20 of the body member 15 and be subsequently deposited in the sumps 25 of the side troughs 22.

With the vehicle standing idle, as when in a garage or driveway, the oil will accumulate in the sump 25. When the vehicle is taken out on the road and a certain speed is attained, the oil which has deposited in the sump 25 will be blown therefrom by air currents which are directed into the sump through the leading mouth 26. As stated above, portions of the top of the troughs 22 are closed by the bottom wall of the crankcase and these troughs thereby operate as air scoops for the intended purpose. The flared mouth 26 may assume different sizes as desired to direct a certain amount of air through the troughs 22, but a preferred size of the mouth is such that the oil will be ejected only at speeds above starting speeds of the vehicle so that oil will not be ejected while the vehicle is moving slowly along a driveway or the like.

The runways 21 are necessarily inclined outwardly so that the oil drippings will flow by gravity into the sumps 25, but in this regard, a slight inclination may be applied to said runways by tightening the drain plug sufficiently to draw up the central portion of the device.

In Figure 3 a slightly modified form of device 10a is illustrated, and, similar to Figure 1, this device has a body portion 15a having a front ridge 19a and a rear ridge 20a, between which are formed runways 21a. Semi-circular side troughs 22a are provided having throat portions 23a, a central sump or chamber 25a and flared end or mouth portions 26a. In this embodiment, the leading mouth 26a is closed by an upper baffle plate 28 having a flared mouth portion 29 and a tapered rearwardly extending wall 30. The wall 30 tapers and, preferably, terminates adjacent the front portion of the sump to effectively direct air currents into the front end of the sump 25a for emptying it.

Figures 4 and 5 illustrate a drip collector 31 designed especially for a crankcase 32 having its drain plug 14 in an angular front wall portion thereof. This device has a dished body portion 33 which forms a sump or chamber for oil drippings, and this body portion has an integral arm 34 disposed at an obtuse angle thereto. The arm 34 has an aperture 36 for receiving the drain plug and is secured to the body portion 33 by side connections 38. Intermediate the side connections 38 is an opening 39 between the arm 34 and the body portion 33 through which air currents flow when the vehicle is traveling on the road for blowing out oil drippings which may have accumulated in the sump. A baffle plate 40, which may comprise an extension of the arm 34, extends downwardly a slight distance into the sump portion to form a deflecting plate for directing air into the sump to remove effectively the oil from the sump.

Figures 6 and 7 illustrate still another form of drip collector, designated by the numeral 44, designed for crankcases 45 having the drain plug 14 disposed on a vertical side wall thereof. The device comprises a semi-cylindrical body portion or trough 46 provided with an arm 47 having an aperture 48 for receiving the drain plug. Body portion 46 has restricted throat portions 50 with a sump or chamber 51 therebetween and outwardly flared mouth portions 52 at the ends. Similar to the Figure 3 embodiment, the leading mouth of the body portion 46 has a closing baffle plate 54 which directs air currents into the sump 51. As viewed in Figure 7, with the vehicle moving to the left, air currents move through the body portion 46 and force the oil out the rear mouth. The baffle plate 54 directs the air currents into the forward portion of the sump 51 for increasing the wind velocity and effectively emptying the receptacle.

The invention disclosed herein thus provides an inexpensive device which is easily applied to a crankcase for preventing oil drippings which may escape from the crankcase from falling on a garage floor or driveway. The device is also applicable for use on transmission housings and other vehicle parts which are likely to drip oil. The device is not limited to drain plug attachment but may be secured to a drip point by any convenient means.

Having now described my invention and in what manner the same may be used, what I claim as new and desire to protect by Letters Patent is:

1. An oil drip collector for a vehicle lubricant housing having a drain plug, comprising a body portion engageable by said drain plug and held on said housing thereby, chamber means in said body portion for collecting oil from said housing, passage means in said body portion for directing said oil into said chamber means, and air scoop means associated with said chamber means for directing forced air currents into said chamber means and ejecting oil therefrom.

2. An oil drip collector for a vehicle lubricant housing having a drain plug, comprising a body portion, an open top trough on said body portion for collecting oil, means on said body portion engageable by said drain plug for counting said device in close proximity to said housing wherein the top of said trough is closed by said housing, said trough having open ends and being disposed in longitudinal relation with said vehicle wherein oil deposited in said trough will be held therein when the vehicle is idle but will be ejected therefrom by air currents when the vehicle is moving.

References Cited in the file of this patent

UNITED STATES PATENTS

| | | |
|---|---|---|
| 572,641 | Kriner | Dec. 8, 1896 |
| 1,129,390 | Hicks | Feb. 23, 1915 |
| 1,630,639 | Taylor | May 31, 1927 |
| 1,841,505 | Sweetland | Jan. 19, 1932 |